(12) United States Patent
DeChard (10) Patent No.: US 10,174,493 B2
(45) Date of Patent: *Jan. 8, 2019

(54) WASTE AND/OR HAZARDOUS LIQUID CONTAINMENT AND COLLECTION SYSTEM

(71) Applicant: Albert DeChard, Tampa, FL (US)

(72) Inventor: Albert DeChard, Tampa, FL (US)

( * ) Notice: Subject to any disclaimer, the term of this patent is extended or adjusted under 35 U.S.C. 154(b) by 160 days.

This patent is subject to a terminal disclaimer.

(21) Appl. No.: 15/454,575

(22) Filed: Mar. 9, 2017

(65) Prior Publication Data

US 2017/0183859 A1  Jun. 29, 2017

Related U.S. Application Data

(63) Continuation-in-part of application No. 14/615,711, filed on Feb. 6, 2015, now Pat. No. 9,630,860.

(51) Int. Cl.
| | |
|---|---|
| *E03F 5/04* | (2006.01) |
| *B01D 17/02* | (2006.01) |
| *B01D 17/04* | (2006.01) |
| *B01D 17/00* | (2006.01) |
| *B08B 17/02* | (2006.01) |

(Continued)

(52) U.S. Cl.
CPC .......... *E03F 5/04* (2013.01); *B01D 17/0208* (2013.01); *B01D 17/0214* (2013.01); *B01D 17/045* (2013.01); *B01D 17/10* (2013.01); *B08B 17/025* (2013.01); *B60S 3/044* (2013.01); *C02F 1/001* (2013.01); *C02F 1/40* (2013.01); *C02F 1/74* (2013.01); *C02F 2001/007* (2013.01); *C02F 2101/32* (2013.01); *C02F 2103/44* (2013.01);

(Continued)

(58) Field of Classification Search
CPC ...... E03F 5/04; E03F 5/0405; B01D 17/0214; B01D 17/045; B01D 17/10; B01D 17/0208; B08B 17/025; C02F 1/74; C02F 1/001; C02F 1/40; C02F 2001/007; C02F 2101/32; C02F 2103/44; B60S 3/044; E03B 1/041; E03B 1/044

See application file for complete search history.

(56) References Cited

U.S. PATENT DOCUMENTS

| 1,764,756 A | 6/1930 | Slee |
| 3,555,224 A | 1/1971 | Frind |

(Continued)

OTHER PUBLICATIONS

Definition of Whereas—Merriam-Webster dictionary (Year: 2018).*

*Primary Examiner* — David C Mellon
*Assistant Examiner* — Liam Royce
(74) *Attorney, Agent, or Firm* — Larson & Larson, P.A.; Frank Liebenow; Justin P. Miller (57) ABSTRACT

A liquid cleaning system rests on a surface having a non-porous material covering and a drain. A lower plate layer and an upper plate layer each have runners arranged in a grid. The lower plate layer rests upon the surface and the upper plate layer rests upon the lower plate layer offset at an angle with respect to the grid of the lower plate layer. An upper layer covers the upper plate layer and has a plurality of holes for the passage of fluids into the liquid cleaning system. As liquid enters the liquid cleaning system through the holes, the liquid traverses the grid of the lower plate layer and the grid of the upper plate layer flowing towards the drain, and contaminants within the liquid collect within the grid of the lower plate layer and the grid of the upper plate layer.

12 Claims, 5 Drawing Sheets

(51) Int. Cl.

| | | |
|---|---|---|
| *C02F 1/74* | (2006.01) | |
| *C02F 1/00* | (2006.01) | |
| *C02F 1/40* | (2006.01) | |
| *B60S 3/04* | (2006.01) | |
| *E03B 1/04* | (2006.01) | |
| *C02F 101/32* | (2006.01) | |
| *C02F 103/44* | (2006.01) | |

(52) U.S. Cl.
CPC ............... *E03B 1/041* (2013.01); *E03B 1/044* (2013.01); *E03F 5/0405* (2013.01)

(56) References Cited

U.S. PATENT DOCUMENTS

| | | | |
|---|---|---|---|
| 4,240,944 A | | 12/1980 | Temple |
| 5,221,570 A | | 6/1993 | Gokcen et al. |
| 5,411,665 A | | 5/1995 | Scraggs et al. |
| 5,738,139 A | | 4/1998 | DeChard |
| 5,976,225 A | * | 11/1999 | Nystrom ................ B01D 35/18 95/278 |
| 7,290,558 B2 | | 11/2007 | DeChard et al. |
| 8,109,696 B2 | | 2/2012 | Maggioni |
| 2005/0025582 A1 | | 2/2005 | Lanniello |
| 2007/0044839 A1 | | 3/2007 | DeChard |

\* cited by examiner

WASTE AND/OR HAZARDOUS LIQUID CONTAINMENT AND COLLECTION SYSTEM

CROSS-REFERENCE TO RELATED APPLICATION

This application is a continuation in part of U.S. patent application Ser. No. 14/615,711, filed Feb. 6, 2015, the disclosure of which is hereby incorporated by reference.

FIELD

The present invention relates to hazardous and/or waste liquid collection and containment. More particularly, it relates to a modular and mobile cleaning system for capturing, containing and collecting hazardous liquids and/or waste water resulting from cleaning of vehicles.

BACKGROUND

Hazardous liquid and waste water collection is known in the prior art. Due to rising concerns that the environment is becoming polluted at an alarming rate and the mandate of the federal Clean Water Act by, governments, both State and Federal, and those in other countries have begun mandating that water runoff from many vehicle washing procedures be contained and collected for proper disposable to avoid further contamination of the environment. For example, the simple process of cleaning a piece of machinery in which oils are separated from the machinery must now be cleaned, in many locales, in a controlled rinsing facility or shower system that collects and contains the water used during the cleaning procedure. The waste water is generally not permitted to simply enter the sewer system or run off into the underground aquifer or nearest body of water. In many locations, the washing of vehicles such as trucks and automobiles requires that the rinse water be captured, contained and disposed of properly.

Other cleaning problems occur with hazardous liquid and waste water containment and collection. In particular, it is possible for businesses, public facilities and land areas to be exposed to or infected with deadly biological or chemical substances that are extremely hazardous to remove. During an exemplary cleaning procedure, the people involved must wear protective suits. When finished in the cleaning operation, the protective wear must be thoroughly cleansed before being removed. However, it is not permitted to allow the rinse water to simply run off and into ground or sewer.

U.S. Pat. No. 7,290,558 to DeChard et al, which is hereby incorporated by reference, shows a mobile waste and containment system that lacks multiple layers of corrugated membranes as will be described.

What is needed is a system that will collect contaminated liquids (e.g. water and other soluble or insoluble material) and separate the undesirable materials from the liquid (e.g., water) for proper disposal of the undesirable materials.

SUMMARY

In one embodiment, a waste water and hazardous chemical containment and collection system is disclosed including a substantially planar, non-porous lower layer. A lower plate layer rests upon the planar, non-porous lower layer and an upper plate layer rests upon the lower plate layer. An upper layer that has several holes for the passage of fluids rests upon the upper plate layer. The overall length and width of the lower plate layer, the upper plate layer, and the upper layer are substantially equal. Fluids enter the system through the holes and some oils from the fluids collect within netting of the lower plate layer and the upper plate layer for later collection.

In another embodiment, a method of treating waste water is disclosed including passing the waste water through holes in an upper layer, thereby filtering out larger particles from the waste water then flowing the waste water over two plate layers. The two plate layers are set over a non-porous layer, thereby capturing oils suspended in the waste water within netting of the plate layers as per the nature of Stokes' Law. Waste water that now has a lower amount of oils drains from the non-porous layer.

In another embodiment, a waste water and hazardous chemical containment and collection system is disclosed including a substantially planar, non-porous lower layer having a drain, a lower plate layer resting upon the planar, non-porous lower layer, upper plate layer resting upon the lower plate layer, an upper layer having a plurality of holes for the passage of fluids, and walls surrounding the lower plate layer, the upper plate layer, and the upper layer. The overall length and width of the lower plate layer, the upper plate layer, and the upper layer are substantially equal (and surrounded by the walls).

In another embodiment, a liquid cleaning system is disclosed. The liquid cleaning system rests on a surface that has a drain. The liquid cleaning system includes a non-porous material covering the surface except for the drain, a lower plate layer and an upper plate layer each having runners arranged in a grid. The lower plate layer rests upon the non-porous material and the upper plate layer rests upon the lower plate layer. The grid of the upper plate layer is offset at an angle with respect to the grid of the lower plate layer. An upper layer covers the upper plate layer. The upper layer has a plurality of holes for the passage of fluids into the upper plate layer and lower plate layer. As the liquid that has entered the liquid cleaning system through the plurality of holes traverses the grid of the lower plate layer and the grid of the upper plate layer flowing towards the drain, contaminants within the liquid collect within the grid of the lower plate layer and the grid of the upper plate layer.

In another embodiment, a liquid cleaning system is disclosed including a lower layer that is substantially non-porous except for a drain and two plate layers that include a lower plate layer and an upper plate layer made of runners arranged in a grid. The lower plate layer rests upon the lower layer and the upper plate layer rests upon the lower plate layer, such that the grid of the upper plate layer is offset at an angle with respect to the grid of the lower plate layer. An upper layer having a plurality of holes for the passage of fluids covers the upper plate layer.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Figure 1:
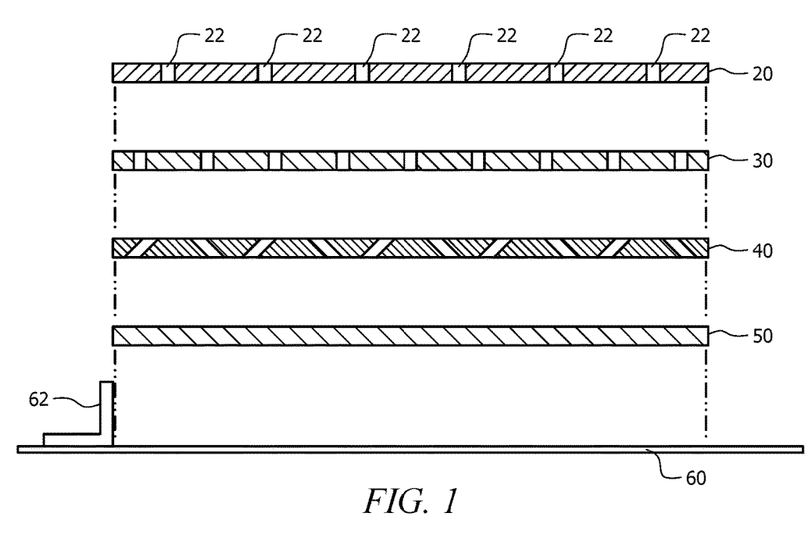
FIG. 1 illustrates a cross-sectional view of a separation portion of a waste and/or hazardous liquid containment and collection system.
Figure 2:
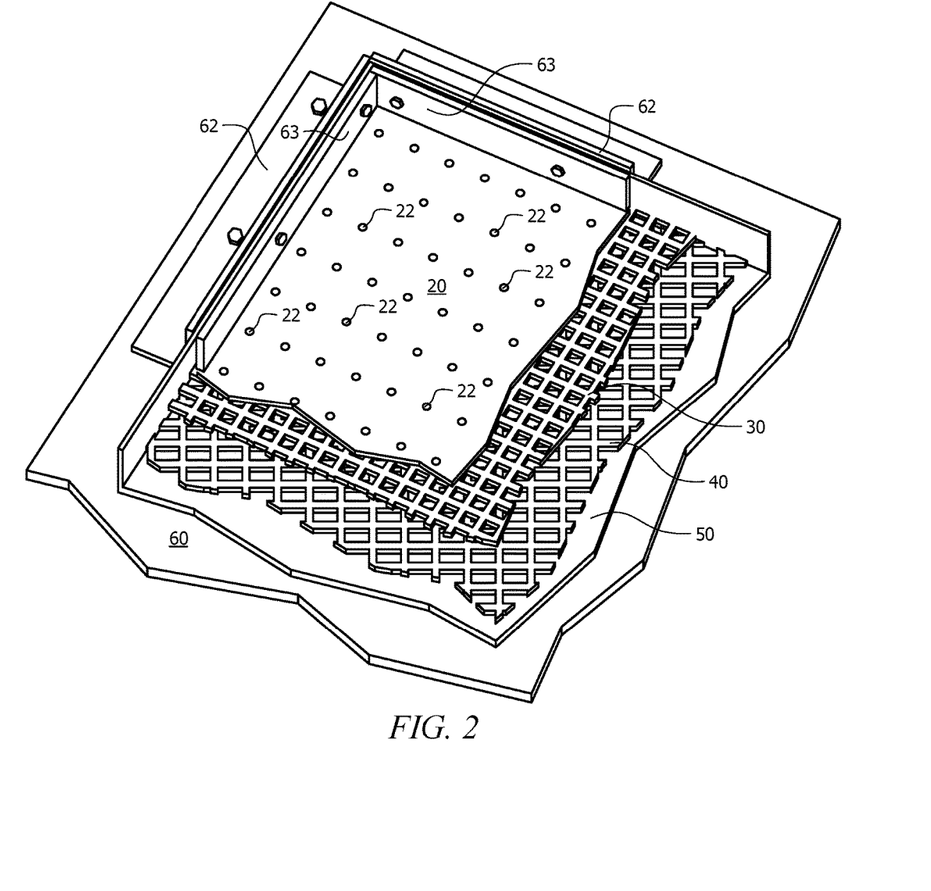
FIG. 2 illustrates a cut-away view of the separation portion of the waste and/or hazardous liquid containment and collection system.

Referring to FIGS. 1 and 2, cross-sectional and cut-away views of a separation portion of a waste and/or hazardous liquid containment and collection system are shown. Although shown in use for vehicle cleaning, the system disclose is capable of separating and proper disposal of liquids from many different applications and is not limited to washing vehicles.

In the process of washing machinery such as vehicles, various chemicals and oils are dislodged from the machinery or vehicles such as gasoline, oils, salts, car wax, tar, etc. Many municipalities prohibit drain water from machinery cleaning or car washes to enter the sewerage and/or drain water system, as these chemicals and oils would then find their way to rivers, streams, and other bodies of water, adding pollutants to such. On the other hand, it is desirable by many to have a clean vehicle, especially in geographies where ice and snow removal include using salts to melt the ice and snow being that such salts are corrosive in nature. Many people like to have clean vehicles and, to enhance the salability of vehicles; automobile dealerships often wash the entire inventory of vehicles on a periodic interval to assure that the fleet of vehicles is appealing to potential buyers.

Many people wash their vehicles at home, in their driveway, using a garden hose and bucket, releasing small amounts of pollutants into the storm drain system, which eventually leads to the above mentioned bodies of water. Many others wash their vehicles in car wash facilities which typically have bays equipped with a high pressure source of water/soap and a drain to wash away excess water and dirt. Washing of vehicles in car wash facilities is preferred, in that, it is more cost-effective to process the contaminated water from the washing process than processing the contaminated water at everybody's home.

In addition to cleaning of the waste water, some localities with limited average rainfall and many localities during drought conditions, prohibit washing of vehicles at homes and offices. In such, car washing facilities are required to recycle water so as to use as little as possible. As one could imagine, it is not good to wash a vehicle with unfiltered water from previous washed vehicles. Using such contaminated water results in a dirty vehicle, even after cleaning. Using contaminated water also results in fine grain grit being power-sprayed onto the vehicle which, besides slowly removing waxes and paint from the vehicle, this grit also clogs the high-pressure spray nozzle, requiring frequent cleaning or replacement of the nozzle.

Figure 4:
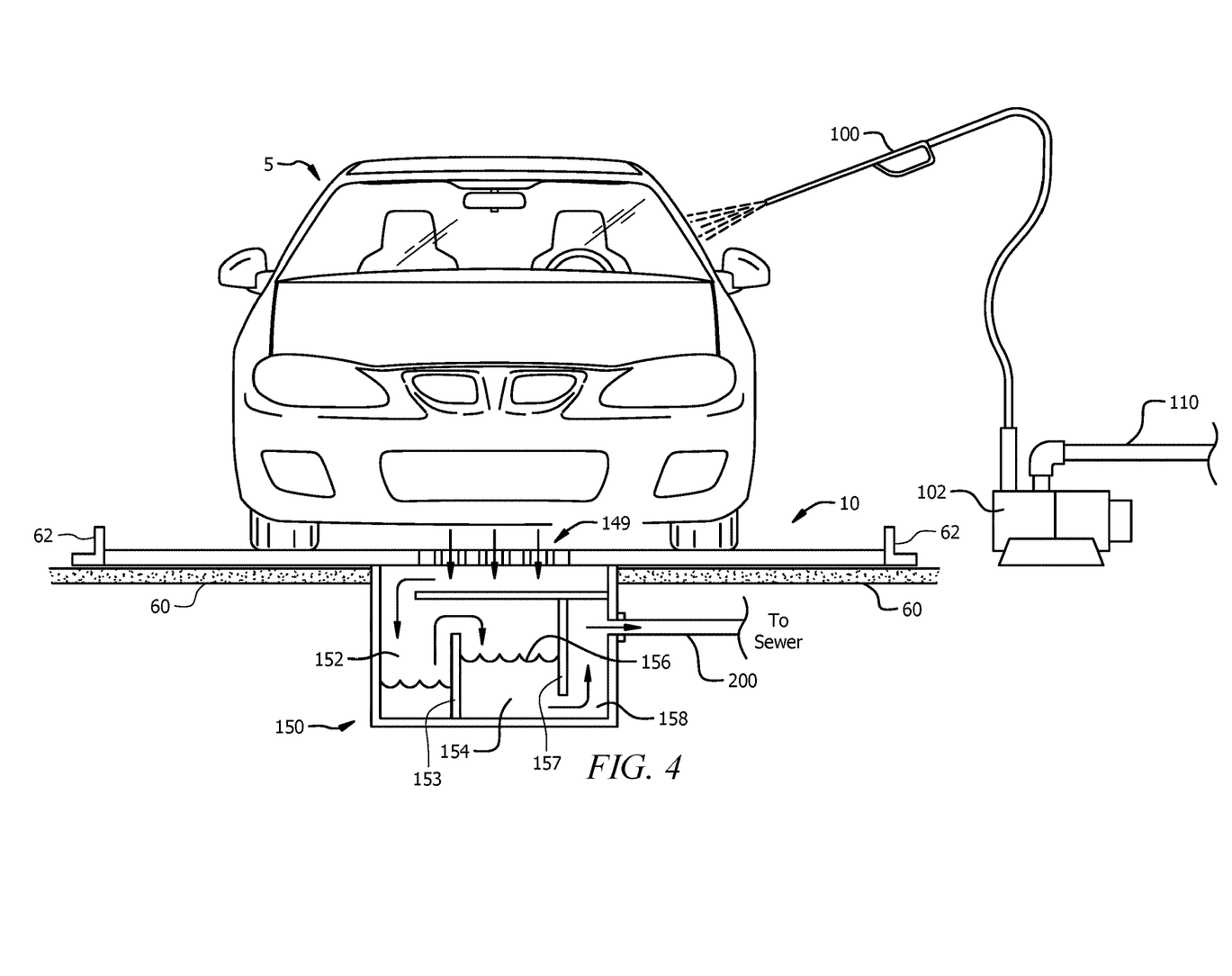
FIG. 4 illustrates a second plan view of the waste and/or hazardous liquid containment and collection system.
Figure 5:
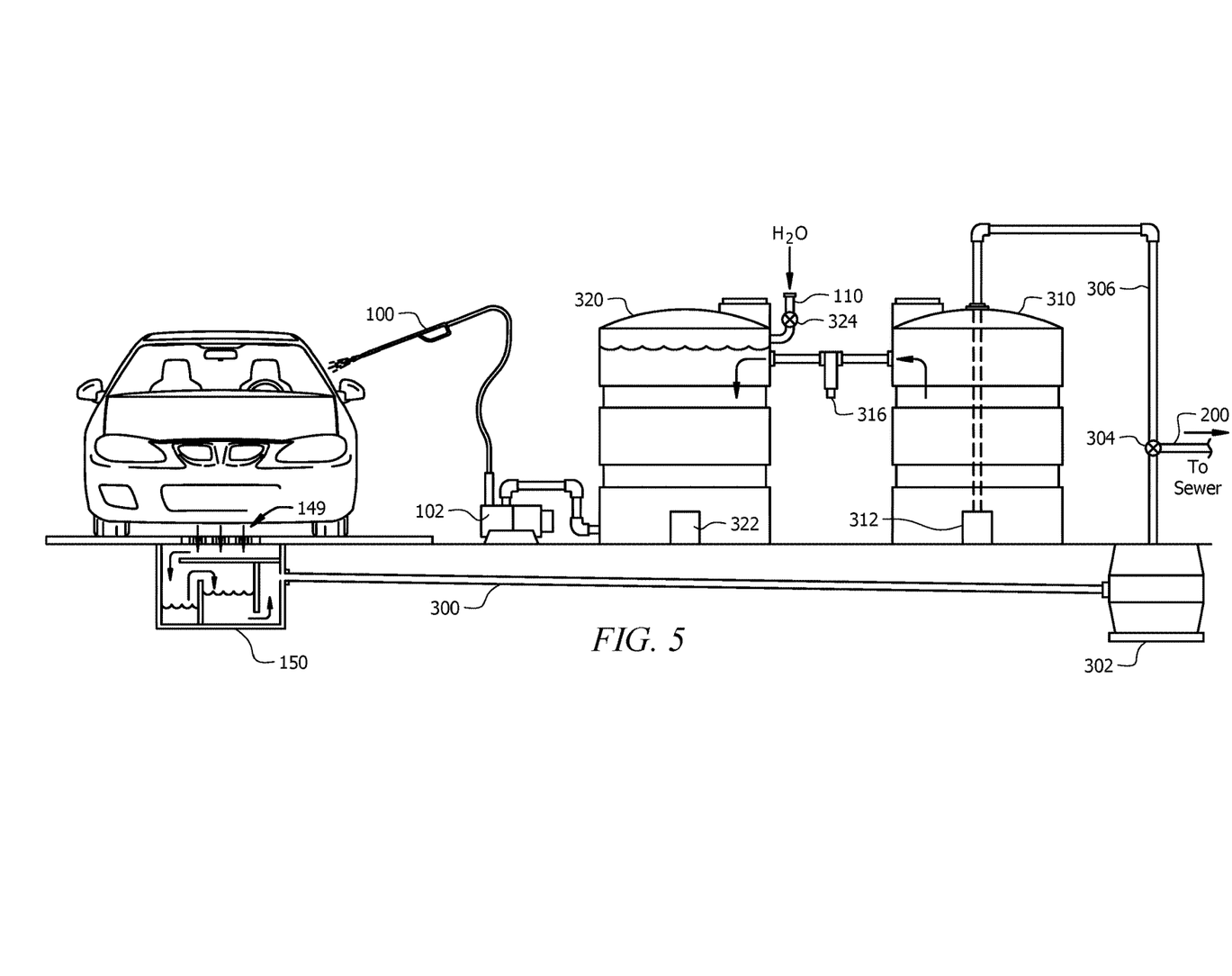
FIG. 5 illustrates a third plan view of the waste and/or hazardous liquid containment and collection system.

To facilitate recycling of the waste water from the above described situations, the disclosed waste and/or hazardous liquid containment and collection system includes one or more separation and/or filtering portions, each independent of the other and useful with or without the others. The first such separation and/or filter section is shown in FIG. 1. This separation portion includes several layers 20/30/40/50. The layers 20/30/40 that are permeable are held atop the impermeable layer 50 by wall members 62 that prevent the contaminated liquids from spilling out from the sides of the layers 20/30/40/50. In some embodiments, the impermeable layer 50 is a water resistant coating on the ground surface 60 (e.g. waterproof paint, sealer, etc.) Although not required, it is anticipated that, in some embodiments, the wall members 62 are fastened to the ground surface 60 (e.g. a cement slab). In some embodiments, plates 63 are fastened to the wall members 62 to secure the layers 20/30/40/50 in place. In a preferred embodiment, the bottom, impermeable layer 50 includes drainage for recycling runoff as shown in FIGS. 4 and 5. Also, although not required, in this preferred embodiment, it is also preferred that there is a slow pitch or incline angled downward with respect to gravity, converging at the drain 149 (see FIGS. 4 and 5).

As contaminated fluids with solids (e.g. water, solids, and pollutants) fall onto the upper layer 20, the contaminated fluids pass through a plurality of holes 22 in the upper layer 20, filtering out large debris such as stones, paper, etc.

The next two layers are plate layers 30/40 are made of geo-membranes or membranes arranged in a grids or similar geometric pattern. The upper plate layer 30 is set over the lower plate layer 40. In a preferred embodiment, the upper plate layer 30 is offset at an angle with respect to the lower plate layer 40. Although any angle is anticipated, an example of one angle is 45 degrees, in that, lines of the grid of the upper plate layer 30 are at 45 degree angles with respect to lines of the grid of the lower plate layer 40. By arranging the plate layers 30/40 in this offset angle, as shown in FIG. 2, on top of the impermeable layer 50, contaminated water with suspended oils must traverse the plate layers 30/40 to reach the drain. As the contaminated water with suspended oils traverses the plate layers 30/40, oil droplets (the leading pollutant) are forced to increase in size, thereby speeding separation from other liquids such as water. As the contaminated water with suspended oils enters the plate layers 30/40, the contaminated water with suspended oils flow towards the drain, e.g. by a slight incline. The contaminated water with suspended oils must traverse the plate layers 30/40. As the contaminated water with suspended oils goes over runners of the lower plate layer 40, pollutants that have a higher specific gravity than water remain within the grid of the lower plate layer 40 and as the fluid goes under runners of the upper plate layer 30, pollutants that have lower specific gravity than water remain within the grid of the upper plate layer 30, thereby filtering out much of the pollutants before they reach the drain 149.

After some number of uses, the upper layer 20 is lifted and the oil is vacuumed out of the plate layers 30/40 for proper disposal and recycling.

As an example, the plate layers 30/40 are textured geo-membranes made by co-extruding textured, high density polyethylene providing chemical resistance and sufficient load carrying abilities to support the weight of most vehicles.

Any impermeable layer 50 is anticipated such as a reinforced polypropylene as known for use as a liner for containment ponds.

Figure 3:
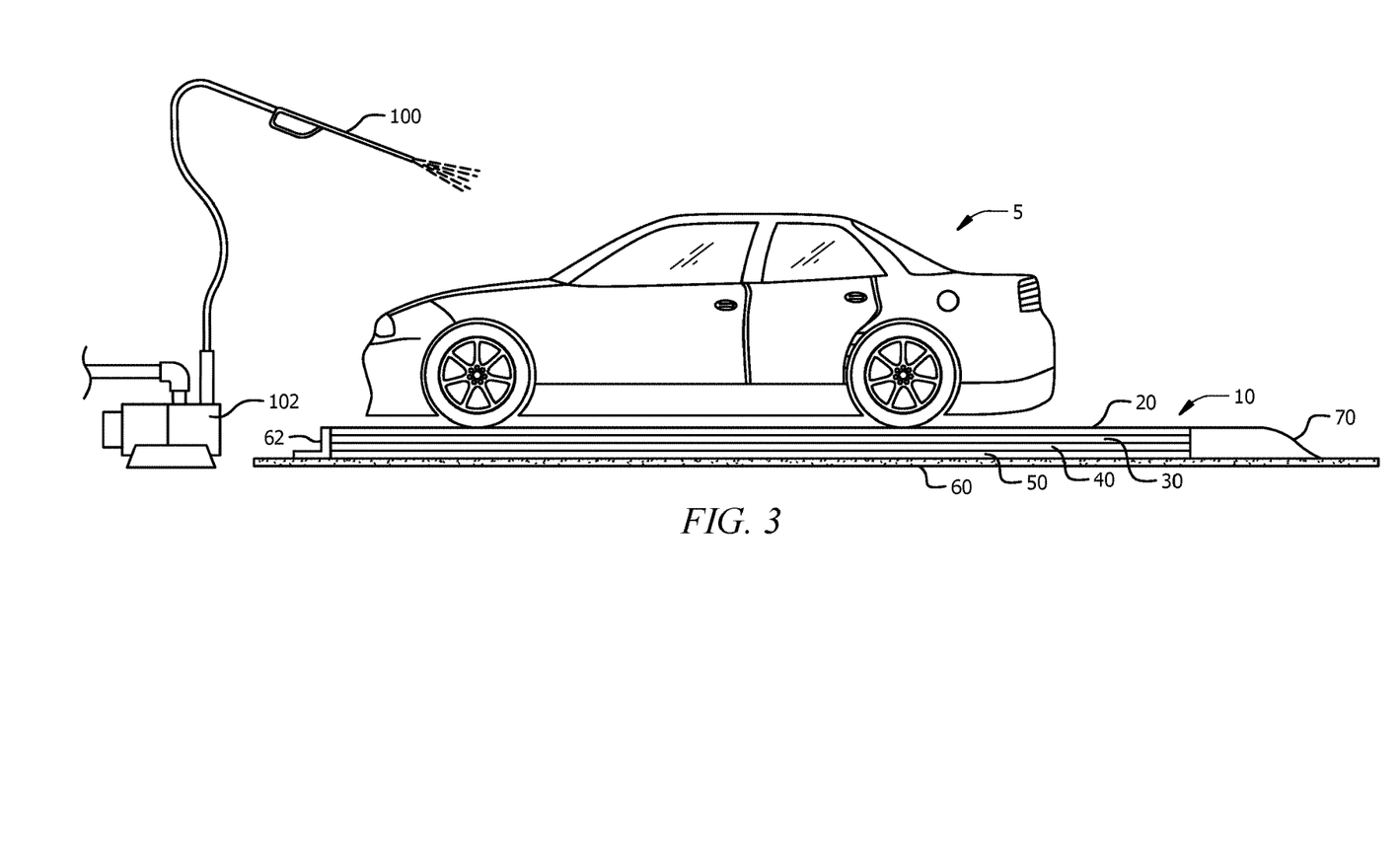
FIG. 3 illustrates a plan view of the waste and/or hazardous liquid containment and collection system.

Referring to FIG. 3, a plan view of the waste and/or hazardous liquid containment and collection system 10 is shown. In this example, a ramp 70 is provided to ease driving of a vehicle 5 onto the collection system 10. For completeness, a high-pressure pump 102 and a washing wand 100 are shown. In operation, dirt and debris are dislodged from the vehicle 5 by the high-pressure water from the washing wand 100 and the now contaminated water, for example having dirt and oils suspended there within, fall onto the upper layer 20 of the collection system 10. The holes 22 in the upper layer 20 filter out large particles such as stones and also reduce splashing of the contaminated water onto the remaining layers 30/40/50. As the contaminated water flows traverses the plate layers 30/40, any oil suspended in the water beads into droplets that further combine with existing droplets of oil and remains within the netting of the plate layers 30/40 as per the nature of Stokes' Law. In such, the sedimentation of the droplets of oil separates the oil from the water. The water (still contaminated with other pollutants) flows to a low spot of the collection system 10 while most of the oil remains within the plate layers 30/40. As in FIGS. 4 and 5, a drain 149 at the low area of the impermeable layer 50 permits collection of the water (with some contaminates). After some number of uses, the upper layer 20 is lifted and the oil is vacuumed out of the plate layers 30/40 for proper disposal and recycling.

Referring to FIGS. 4 and 5, alternate installations of the waste and/or hazardous liquid containment and collection system 10 are shown. In these examples of installations of the collection system 10, after removal of the oils by the plate layers 30/40 per the above explanation, the run-off, dirty water falls through a drain 149 in the impermeable layer 50. Although not required, it is preferred that the layers 20/30/40/50 are slightly pitched towards the drain 149 to facilitate a slow flow of fluid towards the drain 149.

After falling through the drain 149, the run-off, dirty water is further processed by separation tank 150. In this exemplary separation tank 150, the dirty water enters into a first compartment 152. As the first compartment 152 fills, the now cleaner water flows over a weir 153 into a second compartment 154. In such, contaminates that have a higher specific gravity than water (e.g., sand, metal) settle to the bottom of the first compartment 152 and the water and contaminates that have a lower specific gravity than water (e.g., remaining oils, plastics) flow over the weir 153 and into the second compartment 154. In the second compartment 154, contaminates that have a lower specific gravity than water tend to float to the top 156 of the second compartment 154 while the, now, reclaimed water exits from the bottom of the second compartment 154 under a partition 157 (e.g., an inverted weir) and into an exit compartment 158, where the reclaimed water exits, for example, into the sewerage drain 200. As with the plate layers 30/40, after some number of uses, debris, sand, contaminates are vacuumed out of the compartments 152/154/158 and disposed or recycled according to accepted practices.

In FIG. 4, the reclaimed water is not recycled, entering the sewerage drain 200 or any other known waste water disposal system (not shown). In such, fresh water is supplied for cleaning the vehicle 5, for example, from a municipal water supply 110 or well and pump.

In FIG. 5, the reclaimed water exiting the separation tank 150 is gravity fed to a sump 302 through line 300. When the sump 302 fills to a certain point, the reclaimed water from within the sump 302 is pumped out through an exit pipe 306 and is directed by a valve 304 to either the sewerage drain 200 (or other drainage system) or into filtering and separation tanks 310/320. The reclaimed water in the first separation tank 310 is preferably treated with aeration from an air pump 312. As the first separation tank 310 approaches being filled with the reclaimed water, some of the reclaimed water exits the first separation tank 310 from an upper area to exclude some amount of sedimentation, and this water passes through a filter 316, for example, a paper filter, sand filter, carbon filter, etc. The now, substantially clean water enters the second separation tank 320 which optionally has a second aeration pump 322. Should the system lose water (fluid) due to, for example, splashing, evaporation, and some water remaining on the vehicle 5, additional water is added from, for example, a municipal water supply 110 through a supply valve 324 that is used to control the amount of water that is added to the system.

Water (substantially clean water) is then drawn from the bottom of the second separation tank 320. By drawing the water from the bottom of the second separation tank 320, the second separation tank 320 serves as a reservoir, in that, the system will operate and not need refilling from the municipal water supply 110 until the second separation tank 320 is substantially depleted. This requires fewer operations to add water from the supply. In some embodiments (not shown), the supply valve 324 is automatically operated when an electronic device (e.g. a float or other device) determines that the water level in the second separation tank 320 is below a certain level.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A liquid cleaning system resting on a surface, the surface having a drain, the liquid cleaning system comprising:
   a non-porous material covering the surface except for the drain;
   a lower plate layer and an upper plate layer comprising runners arranged in a grid;
   the lower plate layer resting upon the non-porous material;
   the upper plate layer resting upon the lower plate layer, the grid of the upper plate layer offset at an angle with respect to the grid of the lower plate layer; and
   an upper layer covering the upper plate layer, the upper layer having a plurality of holes for the passage of the liquid into the upper plate layer and lower plate layer;
   wherein as the liquid that has entered the liquid cleaning system through the plurality of holes traverses the grid of the lower plate layer and the grid of the upper plate layer flows towards the drain, contaminants within the liquid collect within the grid of the lower plate layer and the grid of the upper plate layer.

2. The liquid cleaning system of claim 1, in which the liquid comprises water with pollutants and oils, the oils having a lower specific gravity than water get trapped in the upper layer, and the pollutants having a higher specific gravity than water get trapped in the lower plate layers and the water exits through the drain.

3. The liquid cleaning system of claim 2, further comprising a separation tank fluidly connected to the drain, the separation tank further removing some of the pollutants and some of the oils that have higher or lower specific gravities than the water through a weir system.

4. The liquid cleaning system of claim 1, further comprising walls surrounding the lower plate layer, the upper plate layer and the upper layer.

5. The liquid cleaning system of claim 1, wherein the lower plate layer and the upper plate layer are textured geo-membranes made by co-extruding textured, high density polyethylene.

6. The liquid cleaning system of claim 1, wherein the non-porous material is a water-resistant coating.

7. The liquid cleaning system of claim 1, wherein the non-porous material is a layer of reinforced polypropylene.

8. A liquid cleaning system comprising:
- a lower layer that is substantially non-porous except for a drain;
- a lower plate layer and an upper plate layer comprising runners arranged in a grid;
- the lower plate layer resting upon the lower layer;
- the upper plate layer resting upon the lower plate layer, such that the grid of the upper plate layer is offset at an angle with respect to the grid of the lower plate layer;
- an upper layer covering the upper plate layer, the upper layer having a plurality of holes for the passage of fluids; and
- walls surrounding the lower plate layer, the upper plate layer, and the upper layer.

9. The liquid cleaning system of claim 8, wherein the lower plate layer and the upper plate layer are textured geo-membranes made by co-extruding textured, high density polyethylene.

10. The liquid cleaning system of claim 8, wherein the lower layer is made of reinforced polypropylene.

11. The liquid cleaning system of claim 8, wherein the lower layer is a water resistant coating.

12. The liquid cleaning system of claim 8, further comprising a separation tank that receives a water, remaining oils, and pollutants from the drain and further removes some of the pollutants and some of the remaining oils that have higher or lower specific gravities than the water through a weir system.

* * * * *